United States Patent
Geerlings et al.

(10) Patent No.: US 10,585,323 B2
(45) Date of Patent: Mar. 10, 2020

(54) LASER ABLATED SURFACE HAVING INDICIA

(71) Applicants: Kurtis L. Geerlings, Zeeland, MI (US); Mark R. Roth, Grand Rapids, MI (US); David J. Cammenga, Zeeland, MI (US); Henry A. Luten, Holland, MI (US)

(72) Inventors: Kurtis L. Geerlings, Zeeland, MI (US); Mark R. Roth, Grand Rapids, MI (US); David J. Cammenga, Zeeland, MI (US); Henry A. Luten, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 194 days.

(21) Appl. No.: 15/674,204

(22) Filed: Aug. 10, 2017

(65) Prior Publication Data

US 2019/0049810 A1    Feb. 14, 2019

(51) Int. Cl.
| | |
|---|---|
| *G02F 1/153* | (2006.01) |
| *G02F 1/03* | (2006.01) |
| *G02F 1/15* | (2019.01) |
| *G09G 3/19* | (2006.01) |
| *G02F 1/155* | (2006.01) |

(52) U.S. Cl.
CPC ............ *G02F 1/1533* (2013.01); *G02F 1/155* (2013.01)

(58) Field of Classification Search
CPC .... G02F 1/1523; G02F 1/1525; G02F 1/1521; G02F 1/1533; G02F 1/155; G02F 1/0316; G02F 3/16; G02F 1/163; C09K 9/02; B60R 1/088; H04N 9/3137; H04N 9/22
USPC ........ 359/265–275, 277, 245–247, 254, 242; 349/49, 105; 438/929; 250/70
See application file for complete search history.

(56) References Cited

U.S. PATENT DOCUMENTS

| | | | |
|---|---|---|---|
| 6,166,848 A | 12/2000 | Cammenga et al. | |
| 6,441,942 B1* | 8/2002 | Branz | G02F 1/1533 359/265 |
| 7,626,749 B2 | 12/2009 | Baur et al. | |
| 2012/0229882 A1 | 9/2012 | Fish et al. | |
| 2016/0085129 A1* | 3/2016 | Cammenga | B60R 1/088 359/275 |
| 2016/0199936 A1 | 7/2016 | Luten et al. | |

OTHER PUBLICATIONS

International Search Report issued for PCT/US2017/046319 dated Jun. 7, 2017.

* cited by examiner

*Primary Examiner* — Dawayne Pinkney
(74) *Attorney, Agent, or Firm* — Foley & Lardner LLP; Bradley D. Johnson

(57) ABSTRACT

A product includes a substrate that is at least partially transparent to visible light. The substrate includes a first surface, an opposing second surface, and a conductive layer disposed on the opposing second surface. The conductive layer has a first ablated area and a second ablated area entirely disposed within and overlapping a portion of the first ablated area. The second ablated area includes a selectively visible indicia.

20 Claims, 11 Drawing Sheets

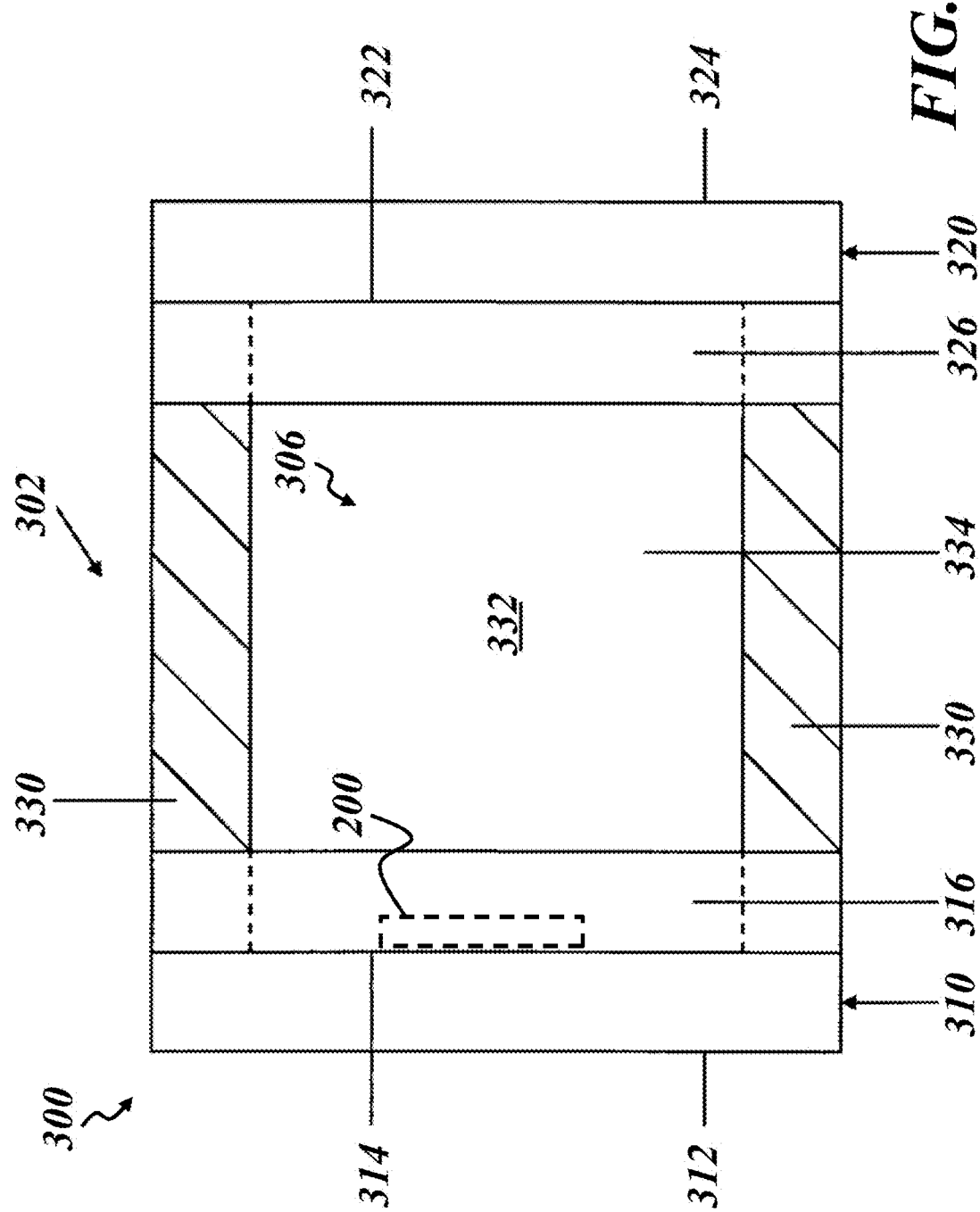

LASER ABLATED SURFACE HAVING INDICIA

TECHNICAL FIELD

The present disclosure generally relates to laser ablation processes and products produced thereby. More specifically, the present disclosure relates to a process for selectively ablating a surface of a dimmable mirror or window structure to produce a visible pattern when the mirror or window is in a particular state.

SUMMARY

One embodiment relates to a product. The product includes a first substrate that is at least partially transparent to visible light. The substrate includes a first surface, an opposing second surface, and a first electrically conductive layer disposed on the opposing second surface. The first electrically conductive layer has a first ablated area and a second ablated area entirely disposed within and overlapping a portion of the first ablated area. The second ablated area defines a selectively visible indicia.

Another embodiment relates to an electrochromic device. The electrochromic device includes a first substrate, a second substrate, and an electrochromic medium. The first substrate has a first surface and an opposing second surface. The opposing second surface includes a first electrically conductive layer disposed thereon having a first ablated area and a second ablated area entirely disposed within and overlapping a portion of the first ablated area. The first ablated area is formed by subjecting the first electrically conductive layer to a first laser ablation process. The second ablated area is formed by additionally subjecting the portion of the first ablated area to a second laser ablation process. The second substrate is spaced from the first substrate to define an interior chamber therebetween. The second substrate has a third surface and an opposing fourth surface. The third surface includes a second electrically conductive layer disposed thereon. The electrochromic medium is disposed within the interior chamber between the first electrically conductive layer and the second electrically conductive layer. The second ablated area is at least partially invisible while the electrochromic medium is in a transparent state. The second ablated area is visible while the electrochromic medium is in a darkened state.

Still another embodiment relates to method. The method includes providing a substrate having a first side and an opposing second side, the opposing second side including a conductive layer and a coating layer disposed thereon; subjecting the substrate to a first laser ablation pass such that the coating layer is removed from at least a portion of the conductive layer; and subjecting the portion of the substrate to one or more additional laser ablation passes to modify a property of at least a sub-portion of the portion of the conductive layer. The sub-portion is completely contained within an area of the portion of the substrate subjected to the first laser ablation pass such that the one or more additional laser ablation passes do not remove any of the coating layer from the conductive layer The invention is capable of other embodiments and of being carried out in various ways. Alternative exemplary embodiments relate to other features and combinations of features as may be recited herein.

BRIEF DESCRIPTION OF THE DRAWINGS

Illustrative embodiments will hereinafter be described in conjunction with the appended drawings, wherein like designations denote like elements.

FIG. 8 is a cross-sectional view of the first electrochromic device of FIG. 6 in the first state, according to an exemplary embodiment.

DETAILED DESCRIPTION

A laser ablation process generally includes selective removal of material at a surface of a workpiece by directing a laser beam at the workpiece. The laser beam is configured to deliver a controlled amount of energy at a laser spot defined where the beam impinges the desired surface. This controlled amount of energy is selected to liquefy, vaporize, or otherwise rapidly expand the surface material at the laser spot to cause it to separate from the workpiece for removal. Laser ablation can be used to remove at least a portion of one or more coatings from a coated substrate, for example, or to otherwise reshape the workpiece surface.

Figure 1:
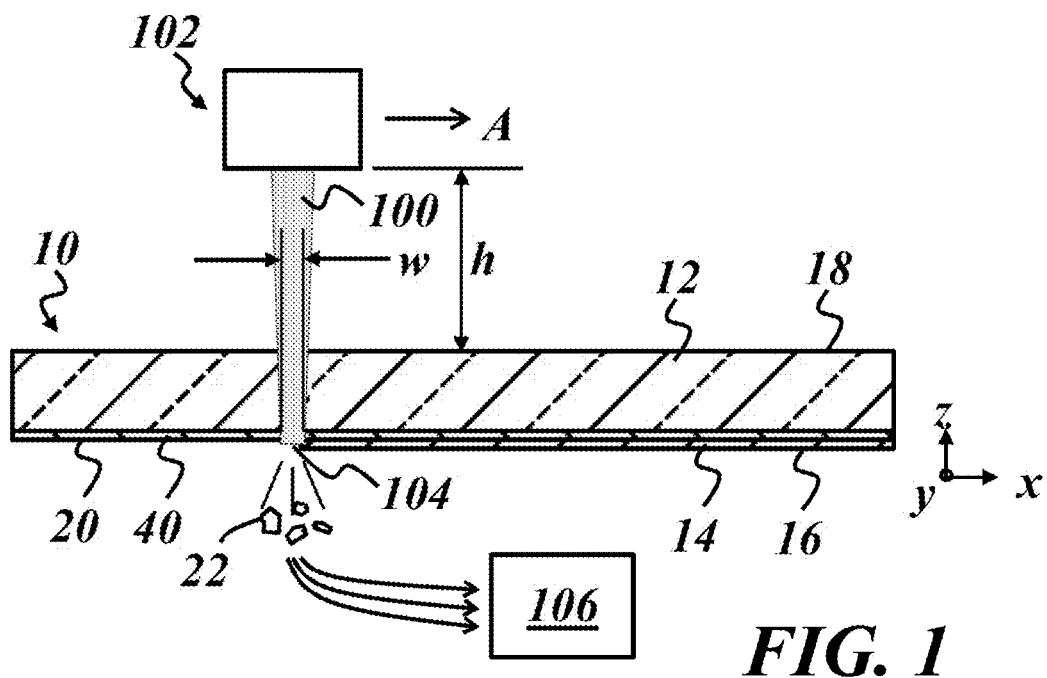
FIG. 1 is a cross-sectional view of a second surface laser ablation process being performed on a workpiece, according to an exemplary embodiment.

FIG. 1 is a side cross-sectional view of an example of a first laser ablation process performed on a workpiece 10. The workpiece 10 is a coated substrate, including a substrate 12 and a coating layer 14. The illustrated process is a second surface ablation process in which the coating layer 14 is located at a second side 16 of the workpiece 10 opposite a first or impingement side 18 of the workpiece 10. A laser beam 100 is provided by a laser source 102 and propagates toward the workpiece 10. In this example, the laser beam 100 is configured with a focal plane at or near a second surface 20 of the substrate 12 and generally parallel with the x-y reference plane to define a laser spot 104 with a characteristic size such as a diameter or width w at the second surface 20. In other examples, the focal plane can be spaced from the second surface 20 by an amount greater than 0 mm up to about 50 mm. The substrate 12 is at least partially transparent to the particular wavelength of laser light of the laser beam 100 so that the laser beam 100 passes through the thickness of the substrate 12 to the second surface 20, where the material of the coating layer 14 absorbs at least some of the energy of the laser beam 100 and is thereby separated from the substrate 12.

In the example of FIG. 1, the removed coating layer material 22 is illustrated in the form of solid particles. The workpiece 10 can be oriented as shown so that gravity causes the removed material 22 to fall away from the workpiece 10. Optionally, a vacuum source 106 is provided to help guide the removed material 22 away from the workpiece 10. The removed material 22 may be in vapor or liquid form when initially separated from the substrate 12. The illustrated arrangement may be useful to prevent the removed material 22 from being redeposited on the workpiece 10, which can be problematic with some first surface ablation processes. The material may also be removed via a spallation process.

Figure 3:
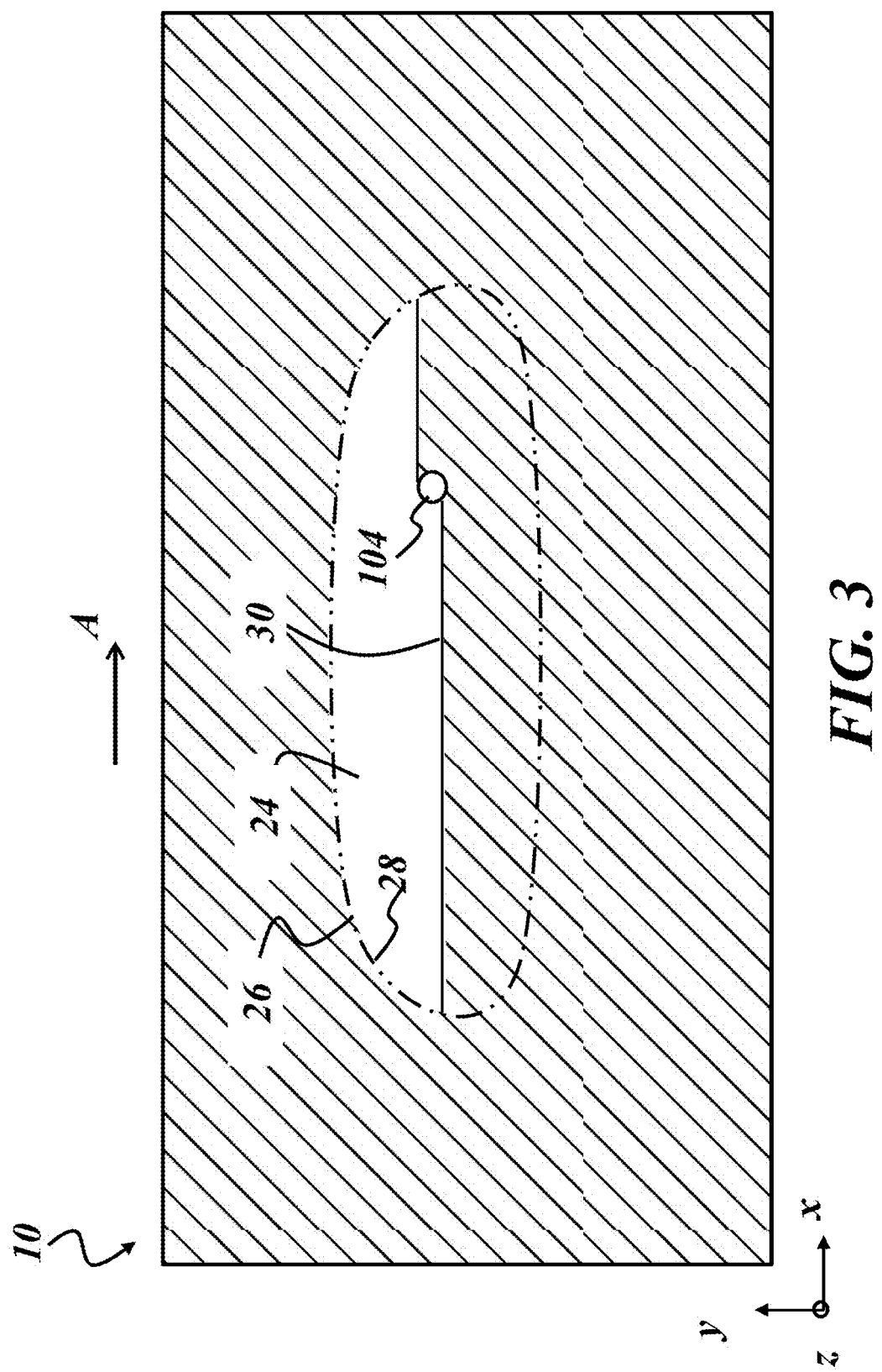
FIG. 3 is a top view of the second surface laser ablation process being performed on the workpiece of FIG. 1, according to an exemplary embodiment.

In order to remove material from an area of the workpiece 10 that is larger than the laser spot 104, the laser beam 100 and/or the workpiece 10 may be moved relative to each other to remove material at a plurality of adjacent and/or overlapping laser spot locations. For instance, after the desired amount of material is removed at a first laser spot location, the workpiece 10 and/or laser beam 100 may move to define a second laser spot location for further removal of material. Continued movement to multiple adjacent and/or overlapping laser spot locations with corresponding material removal at each location defines a first ablated area 24 of the workpiece 10 from which material has been removed, as shown in a top view of the process in FIG. 3, where an intended ablation area 26 is shown in phantom. As shown in FIGS. 1 and 3, the laser beam 100 is moving in an instant process direction A with respect to the workpiece 10. One or both of the laser beam 100 or the workpiece 10 may be moved to achieve this relative movement. In one example, the laser beam 100 moves or scans back and forth in the positive and negative x-direction within the intended ablation area 26, and the laser beam 100 and/or the workpiece 10 is indexed in the y-direction each time the laser beam 100 reaches an edge 28 of the intended ablation area 26 until the coating layer 14 is removed within the entire intended ablation area 26 (e.g., a non-interleaving laser ablation process, etc.). In another example, the laser beam 100 moves or scans back and forth in the positive and negative x-direction within the intended ablation area 26 where consecutive laser spots 104 (e.g., adjacent spots, a first laser spot and a subsequent laser spot, etc.) in the x-direction are physically spaced from each other (e.g., do not overlap, etc.), and the laser beam 100 and/or the workpiece 10 is indexed in the y-direction each time the laser beam 100 reaches an edge 28 of the intended ablation area 26. The consecutive laser spots 104 (e.g., adjacent spots, a first laser spot and a subsequent laser spot, etc.) in the y-direction may also be physically spaced from each other (e.g., do not overlap, etc.). The laser beam 100 may take a plurality of passes across the entire intended ablation area 26, each of the passes at least partially offset from the previous pass such that the entire intended ablation area 26 is scanned after the plurality of passes (e.g.,
all of the desired portions of the coating layer 14 is removed from the intended ablation area 26, an interleaving laser ablation process, etc.).

The coating layer 14 may be formed from nearly any material (e.g., metallic, plastic and/or ceramic) and may generally be less transparent than the substrate 12. Certain metallic materials, such as chromium or chromium-containing materials, may be multi-functional, providing reflectivity, opacity, conductivity, along with a potentially decorative aspect. In some embodiments, the coating layer 14 as provided to the ablation process is itself a multi-layer coating. For instance, the coating layer 14 may include a reflective layer in direct contact with the substrate and a light-absorbing layer over the reflective layer to minimize reflection of the laser light in the ablation process. In other embodiments, some of which are described below in further detail, the workpiece may include an additional layer between the substrate 12 and the coating layer 14. The additional layer may be any appropriate material. In some embodiments, the additional layer may be at least partially transparent, and may have a transparency substantially similar to the transparency of the substrate 12. The additional layer may conduct electricity, and in some embodiments may be formed of a transparent conductive oxide (TCO). In some embodiments, the additional layer may be a dielectric layer. In some embodiments, the additional layer may include multiple layers as part of a multi-layer stack structure. The multi-layer stack structure may include one or more layers of TCO materials, dielectric materials, insulator materials, metal materials, and/or semiconductor materials. The selection of materials for inclusion in the additional layer may be influenced by the refractive index, thickness or sequencing of the layers to achieve a desired reflectance, transmittance, and/or color in the ablated area, non-ablated area, or both. In the description below the additional layer may be referred to as a conductive layer, but it is understood that other additional layer materials described herein may be employed in place of the conductive layer. The coating layer 14 can be selectively ablated from the TCO or dielectric layers. The coating layer 14 may include one or more reflective layers comprising one or more metallic material, metal oxide, metal nitride or other suitable material that provides both reflectivity and opacity. In one embodiment, the workpiece 10 includes a glass substrate, a layer of indium tin oxide (ITO) on the glass substrate, with a coating layer that includes sequential and adjacent layers of chromium (Cr), ruthenium (Ru), Cr, and Ru to form a glass/ITO/Cr/Ru/Cr/Ru material stack.

Some devices that may employ at least a portion of the laser ablated workpiece, such as electrochromic devices, may require one or more electrically conductive layers such as an electrode layer. In an electrochromic device, for example, electrodes may be included on opposite sides of the electrochromic medium wherever it is desired to activate the electrochromic medium in the device. The device may thus also include an electrically conductive layer along at least a portion of the workpiece 10, corresponding to the first ablated area 24 of the workpiece 10. The electrically conductive layer may be formed from a TCO or other suitable conductive material, such as ITO. In one embodiment, the conductive layer overlies the entire workpiece 10.

Figure 2:
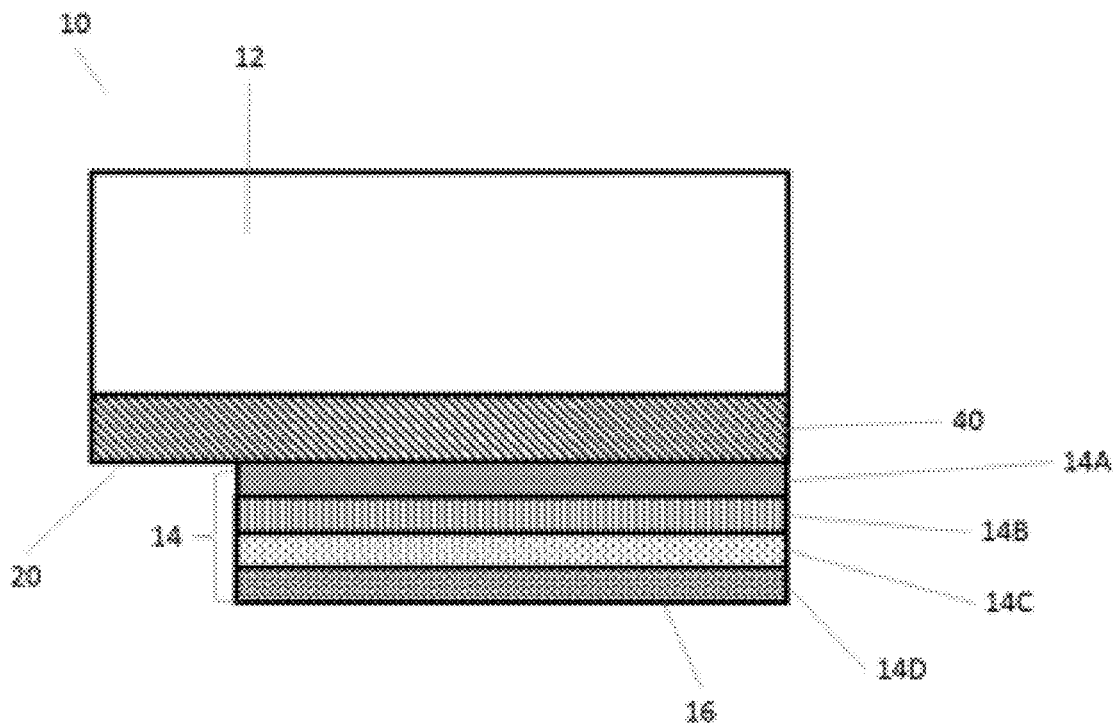
FIG. 2 is a detailed cross-sectional view of the workpiece of FIG. 1, according to an exemplary embodiment.

As shown in FIGS. 1 and 2, the workpiece 10 in the illustrated process includes an electrically conductive layer, shown as conductive layer 40, positioned at the second side 16 of the workpiece between the substrate 12 and the coating layer 14. The conductive layer 40 provides the second surface 20 from which the coating layer 14 is removed, in this example. The illustrated process represents an example of a first laser ablation process in which the laser beam 100 propagates through the conductive layer 40, such as a metallic layer, a TCO layer, and ITO layer, etc., to remove the coating layer 14 from an opposite side of the conductive layer 40. In other embodiments, the conductive layer 40 may be disposed over the second side 16 of the workpiece 10 after the ablation process.

As shown in FIG. 2, the coating layer 14 may be a single layer or may be a multi-layer structure. The function of each layer in the multi-layer structure may be selected to perform different physical, chemical or optical functions. For example, referring to FIG. 2, the coating layer 14 may be subdivided into multiple sub-layers. In some embodiments, a sub-layer 14A adjacent the conductive layer 40 may be an adhesion promoting layer, such as a layer including Cr or Ti. A second sub-layer 14B may be a reflecting layer. The reflecting layer may include a silver-gold alloy chrome, ruthenium, stainless steel, silicon, titanium, nickel, molybdenum, chromium-molybdenum-nickel alloys, nickel chromium, nickel-based alloys, Inconel, indium, palladium, osmium, cobalt, cadmium, niobium, brass, bronze, tungsten, rhenium, iridium, aluminum, aluminum alloys, scandium, yttrium, zirconium, vanadium, manganese, iron, zinc, tin, lead, bismuth, antimony, rhodium, tantalum, copper, gold, platinum, any other platinum group metals, alloys whose constituents are primarily the aforementioned materials, and combinations thereof. A third sub-layer 14C may be an opacifying layer. The opacifying layer may include nickel silicide, chrome, nickel, titanium, Monel, cobalt, platinum, indium, vanadium, stainless steel, aluminum titanium alloys, niobium, ruthenium, molybdenum tantalum alloys, aluminum silicon alloys, nickel chrome molybdenum alloys, molybdenum rhenium alloys, molybdenum, tungsten, tantalum, rhenium, alloys whose constituents are primarily the aforementioned materials, and combinations thereof. The opacifying layer may include materials with real and imaginary refractive indices being relatively large, such as oxides, nitrides, or the like. A fourth sub-layer 14D may be an electrical stabilization layer. The electrical stabilization layer may include the platinum group metals, such as Iridium, Osmium, Palladium, Platinum, Rhodium, Ruthenium, and their alloys or mixtures. Additionally, the coating layer 14 may be further sub-divided such that any sub-layer may comprise further sub-layers within themselves to meet the requirements of the stack.

Figure 4:
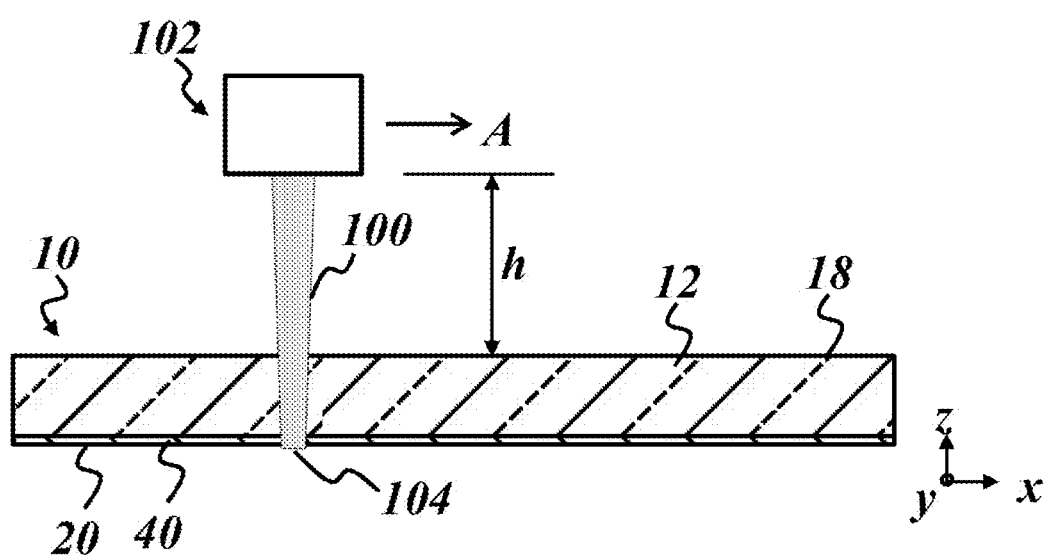
FIG. 4 is a cross-sectional view of the second surface laser ablation process being performed on the workpiece of FIG. 1 for a second time, according to an exemplary embodiment.
Figure 5:
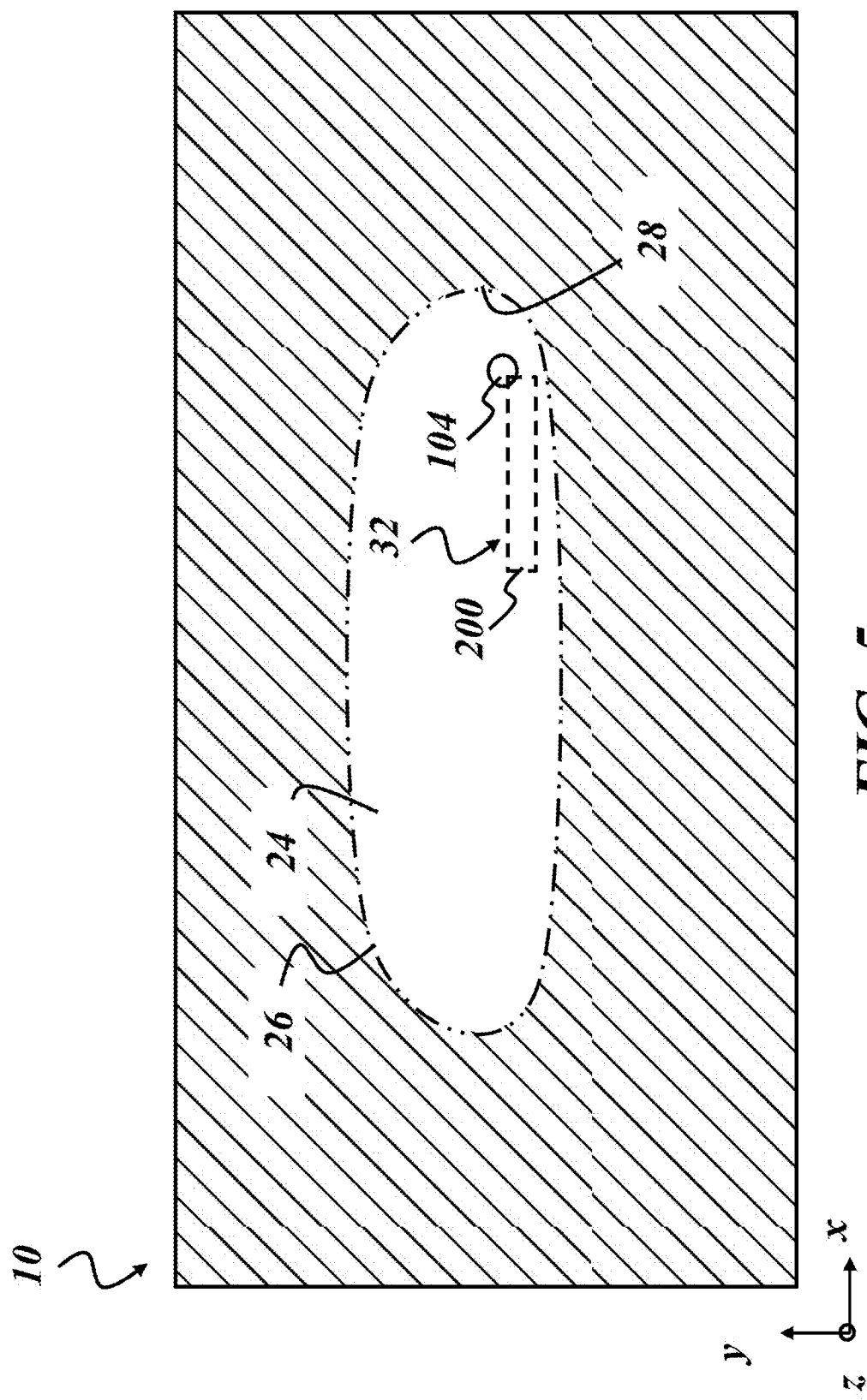
FIG. 5 is a top view of the second surface laser ablation process being performed on the workpiece of FIG. 4, according to an exemplary embodiment.

According to the exemplary embodiment shown in FIGS. 4 and 5, a second laser ablation process is performed on the workpiece 10 after the coating layer 14 is removed from the conductive layer 40 via the first laser ablation process. As shown in FIGS. 4 and 5, the laser spot 104 of the laser beam 100 is applied during the second laser ablation process to a desired portion of the first ablated area 24 of the conductive layer 40, shown as second ablated area 32. As shown in FIG. 5, the second ablated area 32 overlaps the desired portion of the first ablated area 24 such that the entirety of the second ablated area 32 is disposed within the first ablated area 24, which has already been ablated in its entirety (e.g., the second ablated area 32 does not straddle the first ablated area 24 and a previously non-ablated area, etc.). Therefore, the second ablated area 32 is a sub-portion of the first ablated area 24 that is completely contained within the first ablated area 24 where the workpiece 10 was already subjected to the first laser ablation pass to remove the coating layer 14 therefrom, thereby forming the first laser ablated area 24, and then the workpiece 10 is subjected to one or more additional laser ablation passes that do not remove any of the coating layer 14, but completely overlap the desired portion of the first ablated area 24, forming the second ablated area 32 within the first ablated area 24 (i.e., the entirety of the second ablated area 32 is subjected to the first laser ablation pass, as well as the one or more addition laser ablation passes).

Such an application of the laser spot 104 to the second ablated area 32 after the first ablation process is applied thereto may modify the surface of the conductive layer 40 that is subjected to the second laser ablation process within the second ablated area 32. By way of example, the modification of the surface of the conductive layer 40 may include reducing the thickness, roughening the surface, increasing the resistance, and/or altering the color of the conductive layer 40 within the second ablated area 32 relative to the conductive layer 40 within the first ablated area 24. According to one exemplary embodiment, the modification includes a process in which the conductive layer is thinned by approximately zero to seven nanometers. In some embodiments, the conductive layer is thinned by more than seven nanometers (e.g., ten, fifteen, twenty nanometers, etc.).

According to an exemplary embodiment, such modification to the conductive layer 40 within the second ablated area 32 may induce an optical characteristic change to the conductive layer 40 (e.g., reflection/absorption versus wavelength, etc.) in the second ablated area 32 that creates a selectively visible indicia, shown as indicia 200. The indicia 200 may include a symbol, a logo, an image, a pattern, a word, a phrase, a warning, an identification number (e.g., a product number, a VIN number, a serial number, a barcode, etc.), and/or the like. By way of example, the indicia 200 may be typically invisible during normal operation, but may become visible during a darkened state, as described in more detail herein. By way of another example, the greater the change in the thickness and/or the roughness of the conductive layer 40 in the second ablated area 32 relative to the first ablated area 24 may provide an increasingly visible indicia 200 in the darkened state. By way of yet another example, the modification of the second ablated area 32 may change the color thereof from a first color (e.g., a magenta color, a purple color, a combination of a red and a blue color, etc.; the color of the first ablated area 24; etc.) to a second, different color.

According to the exemplary embodiments shown in FIGS. 6-11, a device, shown as electrochromic device 300, includes either a first electrochromic device, shown as window electrochromic device 302, or a second electrochromic device, shown as mirror electrochromic device 304. According to an exemplary embodiment, the window electrochromic device 302 is configured as an aircraft window. In other embodiments, the window electrochromic device 302 is configured as another type of window (e.g., an automobile window, a building window, etc.). According to an exemplary embodiment, the mirror electrochromic device 304 is configured as an automobile mirror (e.g., a rear view mirror, a side view mirror, etc.). In other embodiments, the mirror electrochromic device 304 is configured as another type of mirror (e.g., a bathroom mirror, etc.).

Figure 11:
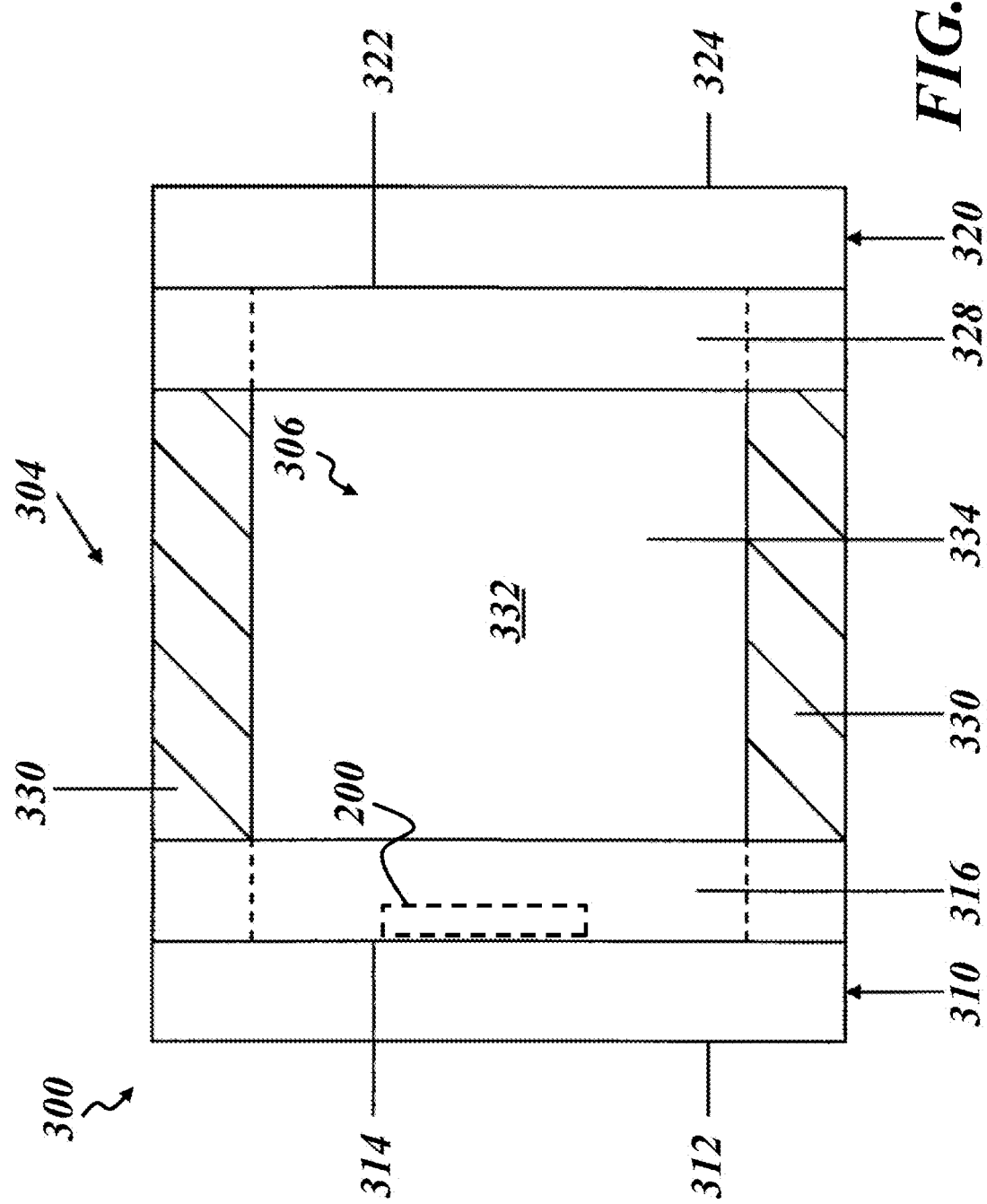
FIG. 11 is a cross-sectional view of the second electrochromic device of FIG. 9 in the first state, according to an exemplary embodiment.

As shown in FIGS. 8 and 11, the electrochromic device 300 includes a first substrate (e.g., similar to workpiece 10, etc.), shown as first substrate 310, a second substrate, shown as second substrate 320, a sealing member, shown as seal 330, and a medium, shown as electrochromic medium 334. According to an exemplary embodiment, the first substrate 310 is at least partially transparent (e.g., substantially transparent, etc.). As shown in FIGS. 8 and 11, the first substrate 310 has a first surface, shown as exterior surface 312, and an opposing second surface, shown as interior surface 314.

In some embodiments, the first substrate 310 is fabricated from any one of a number of materials that are transparent or substantially transparent in the visible region of the electromagnetic spectrum. By way of example, the first substrate 310 may be or include borosilicate glass, boroaluminosilicate glass, soda lime glass, natural and synthetic polymeric resins, plastics, and/or composites including polyesters (e.g., PET), polyimides (PI), polycarbonates, polysulfones, polyethylene naphthalate (PEN), ethylene vinyl acetate (EVA), acrylate polymers, polyamides like Trogamide® CX 7323 from Evonik Industries, cyclic olefin polymers (COP), and cyclic olefin co-polymers (COC) like Topas®. In some embodiments, the first substrate 310 is fabricated from a sheet of glass having a thickness ranging from approximately 0.10 millimeters (mm) to approximately 12.7 mm, from approximately 0.50 mm to approximately 1.50 mm, or from approximately 0.65 mm to approximately 1.00 mm. Of course, the thickness of the first substrate 310 may depend largely upon the particular application of the electrochromic device 300 (e.g., an automotive application, an aircraft application, etc.). While particular substrate materials have been disclosed, for illustrative purposes only, numerous other substrate materials may be used, provided they are substantially transparent and exhibit appropriate physical properties, such as strength, to be able to operate effectively in conditions of intended use. Indeed, the electrochromic device 300 may be, during normal operation, exposed to extreme temperature variation as well as substantial UV radiation, emanating primarily from the sun. It will be further understood that the first substrate 310 may include a UV absorbing layer and/or contain a UV absorbing material to help protect the substrate(s) and/or the electrochromic medium 334 from UV damage.

As shown in FIGS. 8 and 11, the interior surface 314 of the first substrate 310 includes a first electrically conductive layer, shown as transparent conductive layer 316, disposed thereon. According to an exemplary embodiment, the transparent conductive layer 316 acts as a first electrode for the electrochromic device 300. The transparent conductive layer 316 may include one or more layers of electrically conductive material. The one or more layers of the transparent conductive layer 316 may include a material that: (i) is substantially transparent in the visible region of the electromagnetic spectrum; (ii) bonds reasonably well to the first substrate 310; (iii) maintains this bond when associated with the seal 330; (iv) is generally resistant to corrosion from materials contained within the electrochromic device 300 or the atmosphere; and/or (v) exhibits minimal diffuse or specular reflectance as well as sufficient electrical conductance. The electrically conductive material of the transparent conductive layer 316 may be or include fluorine doped tin oxide (FTO), for example TEC glass, indium/tin oxide (ITO), doped zinc oxide, indium zinc oxide, metal oxide/metal/metal oxide (wherein metal oxide can be substituted with metal carbide, metal nitride, metal sulfide, etcetera), or other materials known to those having ordinary skill in the art. Alternatively one or more metals or alloys can be deposited in a pattern to create a grid or nano-structured electrode on the first substrate 310.

According to an exemplary embodiment, the second substrate 320 of the window electrochromic device 302 is at least partially transparent (e.g., substantially transparent, etc.). According to another exemplary embodiment, the second substrate 320 of the mirror electrochromic device 304 is non-transparent. As shown in FIGS. 8 and 11, the second substrate 320 has a third surface, shown as interior surface 322, and an opposing fourth surface, shown as exterior surface 324. In some embodiments, the second substrate 320 is fabricated from similar materials as that of the first substrate 310. In other embodiments, the second substrate 320 is fabricated from different materials than the first substrate 310. In some embodiments, the second substrate 320 is fabricated from a sheet of glass or plastic having a thickness ranging from approximately 0.10 mm to approximately 12.7 mm, from approximately 0.50 mm to approximately 1.50 mm, or from approximately 0.65 mm to approximately 1.00 mm. If the first substrate 310 and the second substrate 320 are fabricated from sheets of glass, then the glass may optionally be tempered, heat strengthened, chemically strengthened, and/or laminated prior to or subsequent to being coated with layers of electrically conductive material.

As shown in FIG. 8, the interior surface 322 of the second substrate 320 of the window electrochromic device 302 includes a second electrically conductive layer, shown as transparent conductive layer 326, disposed thereon. According to an exemplary embodiment, the transparent conductive layer 326 acts as a second electrode for the window electrochromic device 302. The transparent conductive layer 326 may include one or more layers of electrically conductive material. The one or more layers of the transparent conductive layer 326 may include a material that: (i) is substantially transparent in the visible region of the electromagnetic spectrum; (ii) bonds reasonably well to the second substrate 320; (iii) maintains this bond when associated with the seal 330; (iv) is generally resistant to corrosion from materials contained within the window electrochromic device 302 or the atmosphere; and/or (v) exhibits minimal diffuse or specular reflectance as well as sufficient electrical conductance. The electrically conductive material of the transparent conductive layer 326 may be or include FTO, for example TEC glass, ITO, doped zinc oxide, indium zinc oxide, metal oxide/metal/metal oxide (wherein metal oxide can be substituted with metal carbide, metal nitride, metal sulfide, etcetera), or other materials known to those having ordinary skill in the art. Alternatively one or more metals or alloys can be deposited in a pattern to create a grid or nano-structured electrode on the second substrate 320.

As shown in FIG. 11, the interior surface 322 of the second substrate 320 of the mirror electrochromic device 304 includes a third electrically conductive layer, shown as reflective conductive layer 328, disposed thereon. According to an exemplary embodiment, the reflective conductive layer 328 acts as a second electrode for the mirror electrochromic device 304. The reflective conductive layer 328 may include one or more layers of electrically conductive material. The one or more layers of the reflective conductive layer 328 may a material that: (i) is substantially reflective to visible light; (ii) bonds reasonably well to the second substrate 320; (iii) maintains this bond when associated with the seal 330; (iv) is generally resistant to corrosion from materials contained within the mirror electrochromic device 304 or the atmosphere; and/or (v) exhibits sufficient electrical conductance. The electrically conductive material of the reflective conductive layer 328 may be or include a reflective metal coating.

As shown in FIGS. 8 and 11, the second substrate 320 is spaced from the first substrate 310 such that an interior chamber, shown as chamber 332, is defined therebetween. As shown in FIG. 8, the electrochromic medium 334 is disposed within the chamber 332 between the transparent conductive layer 316 disposed on the interior surface 314 of the first substrate 310 and the transparent conductive layer 326 disposed on the interior surface 322 of the second substrate 320 of the window electrochromic device 302. As shown in FIG. 11, the electrochromic medium 334 is disposed within the chamber 332 between the transparent conductive layer 316 disposed on the interior surface 314 of the first substrate 310 and the reflective conductive layer 328 disposed on the interior surface 322 of the second substrate 320 of the mirror electrochromic device 304.

According to an exemplary embodiment, the seal 330 is positioned to effectively seal the chamber 332 such that the electrochromic medium 334 does not leak therefrom. The seal 330 may extend between and around the entire periphery of the interior surface 314 of the first substrate 310 and the interior surface 322 of the second substrate 320. The seal 330 may be or include any material that is capable of being adhesively bonded to the electrically conductive materials coated on the first substrate 310 (e.g., the transparent conductive layer 316, etc.) and the second substrate 320 (e.g., the transparent conductive layer 326, the reflective conductive layer 328, etc.) to seal the electrochromic medium 334 within the chamber 332. By way of example, the seal 330 may (i) have good adhesion to glass, metals, metal oxides, and/or other substrate materials, (ii) have low permeability for oxygen, moisture vapor, and/or other detrimental vapors and gasses, and (iii) not interact with or poison the electrochromic medium 334 the seal 330 is meant to contain and protect. In some embodiments, a portion of the electrically conductive layers (e.g., the transparent conductive layer 316, the transparent conductive layer 326, the reflective conductive layer 328, etc.) may be partially removed where the seal 330 is positioned. In such embodiments, the seal 330 may be configured to bond and adhere to glass, plastics, or other substrates that are not conductive.

According to an exemplary embodiment, the composition of the electrochromic medium 334 disposed within the chamber 332 may include at least one anodic electroactive material, at least one cathodic electroactive material, and at least one solvent. The at least one of the anodic electroactive and cathodic electroactive materials may be electrochromic. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

The electrochromic medium 334 may include a single-layer of material, which may include small non-homogenous regions and includes solution-phase devices where a material may be contained in solution in an ionically conducting electrolyte which remains in solution in the electrolyte when electrochemically oxidized or reduced. Solution phase electroactive materials may be contained in the continuous solution-phase of a gel composition. More than one anodic and cathodic material can be combined to give a pre-selected color. The anodic and cathodic materials may also be combined or linked by a bridging unit. Additionally, a single-layer, single-phase composition may include a composition where the anodic and cathodic materials are incorporated into a polymer matrix. The electrochromic medium 334 may be made up in layers and/or include a material attached directly to an electrically conducting electrode (e.g., the transparent conductive layer 316, the transparent conductive layer 326, the reflective conductive layer 328, etc.) or confined in close proximity thereto which remains attached or confined when electrochemically oxidized or reduced. In the electrochromic medium 334, one or more materials may undergo a change in phase during the operation of the electrochromic device 300. For example, a material contained in solution in the ionically conducting electrolyte forms a layer on the electrically conducting electrode when electrochemically oxidized or reduced.

In addition, the electrochromic medium 334 may include other materials, such as UV absorbers, UV stabilizers, thermal stabilizers, antioxidants, thickeners, viscosity modifiers, tint providing agents, redox buffers, and mixtures thereof. Suitable UV-stabilizers may include, but are not limited to, 2-ethyl-2-cyano-3,3-diphenyl acrylate; (2-ethylhexyl)-2-cyano-3,3-diphenyl acrylate; 2-(2'-hydroxy-4'-methylphenyl)benzotriazole, sold by Ciba-Geigy Corp. under the trademark Tinuvin P; 3-[3-(2H-benzotriazole-2-yl)-5-(1,1-dimethylethyl)-4-hydroxyphenyl]propionic acid pentyl ester—prepared from Tinuvin 213, sold by Ciba-Geigy Corp., via conventional hydrolysis followed by conventional esterification (hereinafter "Tinuvin PE"); 2,4-dihydroxybenzophenone; 2-hydroxy-4-methoxybenzophenone; and 2-ethyl-2'-ethoxyalanilide. In some embodiments, the electrochromic composition further includes an anodic and/or cathodic color-stabilizing redox buffer. In some embodiments, the electrochromic medium 334 may additionally include a cross-linked polymer matrix, a free-standing gel, and/or a substantially non-weeping gel.

Anodic materials may include any one of a number of materials including ferrocene, substituted ferrocenes, substituted ferrocenyl salts, phenazine, substituted phenazines, phenothiazine, substituted phenothiazines including substituted triphenodithiazines, thianthrene, and substituted thianthrenes. Examples of anodic materials may include di-tert-butyl-diethylferrocene; 5,10-dimethyl-5,10-dihydrophenazine (DMP); 3,7,10-trimethylphenothiazine; 2,3,7,8-tetramethoxy-thianthrene; 10-methylphenothiazine, tetramethylphenazine (TMP); and bis(butyltriethylammonium)-para-methoxytriphenodithiazine (TPDT). The anodic material may also include a polymer film, such as a polyaniline, a polythiophene, a polymeric metallocene, or a solid transition metal oxide, including, but not limited to, oxides of vanadium, nickel, and iridium, as well as numerous heterocyclic compounds.

In another embodiment, at least one of the anodic electroactive materials includes a phenazine compound. Such compounds may be substituted or unsubstituted. Illustrative phenazine compounds include, but are not limited to 2,7-dialkyl-5,10-dialkyl-5,10-dihydrophenazines. In some such embodiments, at least one alkyl group of the 5,10-dialkyl groups in the phenazine has at least 4 carbon atoms, and is void of any β-hydrogen atoms, and at least one alkyl group of the 2,7-dialkyl groups in the phenazine has at least 4 carbon atoms. In another embodiment, at least one alkyl group of the 5,10-dialkyl groups is a neopentyl, and at least one alkyl group of the 2,7-dialkyl groups is isobutyl, (2-ethylbutyl), or (2-propylpentyl) group. In some embodiments, at least one alkyl group of the 5,10-dialkyl groups is a neopentyl, and at least one alkyl group of the 2,7-dialkyl groups is a 2-ethyl-1-butanol. In another embodiment, at least one alkyl group of the 5,10-dialkyl groups is a neopentyl, and at least one alkyl group of the 2,7-dialkyl groups is an isobutyl.

Cathodic materials may include, for example, viologens, such as methyl viologen tetrafluoroborate, octyl viologen tetrafluoroborate (octylviologen), or benzyl viologen tetrafluoroborate; and/or ferrocinium salts, such as (6-(tri-tert-butylferrocinium)hexyl)triethylammonium di-tetrafluoroborate (TTBFc.$^+$). While specific cathodic materials have been provided for illustrative purposes only, numerous other conventional cathodic materials may be used. The cathodic material may include a polymer film, such as various polythiophenes or polymeric viologens, an inorganic film, or a solid transition metal oxide, including, but not limited to, tungsten oxide. In one embodiment, at least one of the cathodic electroactive material includes a viologen. In another embodiment, at least one of the cathodic electroactive material includes a 1,1'dialkyl-4,4'-dipyridinium compound. In another embodiment, at least one alkyl group attached to the dipyridinium compound includes at least 4 carbon atoms, and fewer than two β-hydrogen atoms. In another embodiment, at least one alkyl group of the dipyridinium compound includes a (2-ethylhexyl) group. In some embodiments, a viologen counter ion is any anion. Illustrative anions include, but are not limited to, $BF_4^-$, $PF_6^-$, $SbF_6^-$, p-toluenesulfonate, trifluoromethansulfonate, or bis-trifluoromethanesulfonimide.

As shown in FIGS. 8 and 11, the transparent conductive layer 316 of the first substrate 310 includes the indicia 200. By way of example, the transparent conductive layer 316 of the first substrate 310 may undergo (i) the first laser ablation process (see FIGS. 1-3) such that the transparent conductive layer 316 has the first ablated area 24 and (ii) the second laser ablation process (see FIGS. 4-5) such that the transparent conductive layer 316 has the second ablated area 32 that overlaps a portion of the first ablated area 24, thereby defining the indicia 200 within and/or on the transparent conductive layer 316.

Figure 7:
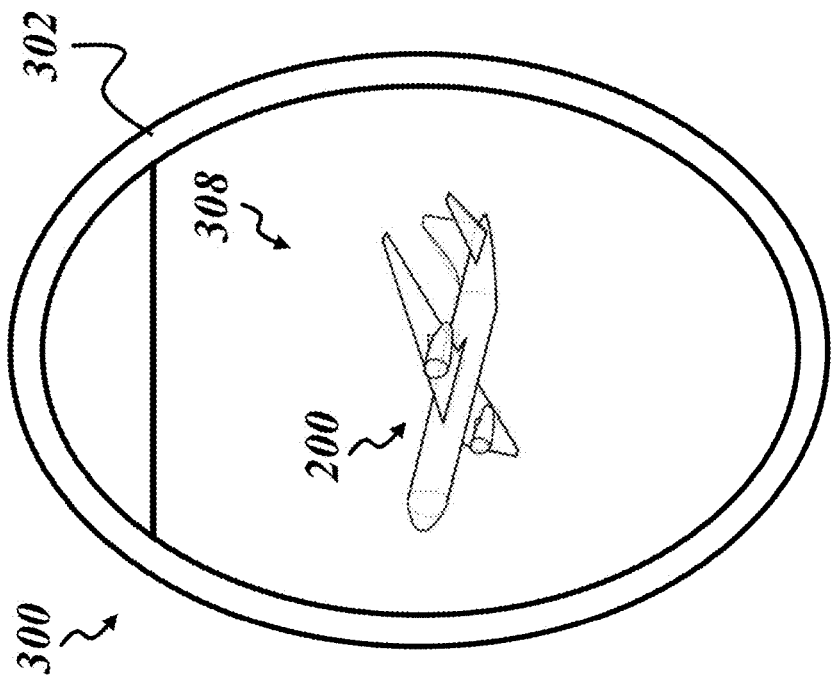
FIG. 7 is a front view of the first electrochromic device of FIG. 6 in a second state, according to an exemplary embodiment.
Figure 6:
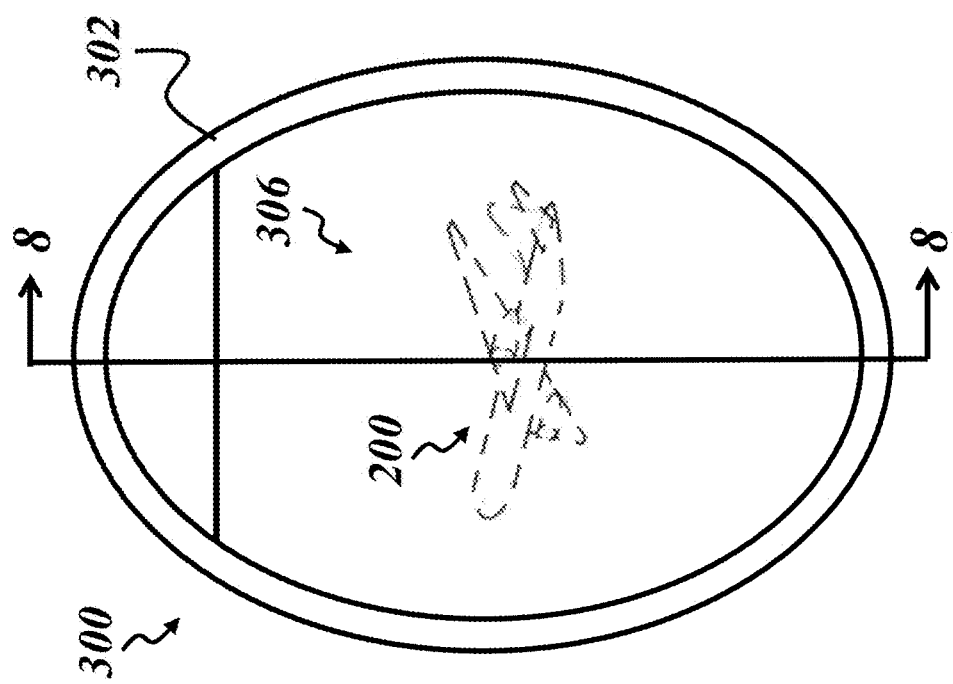
FIG. 6 is a front view of a first electrochromic device in a first state, according to an exemplary embodiment.
Figure 9:
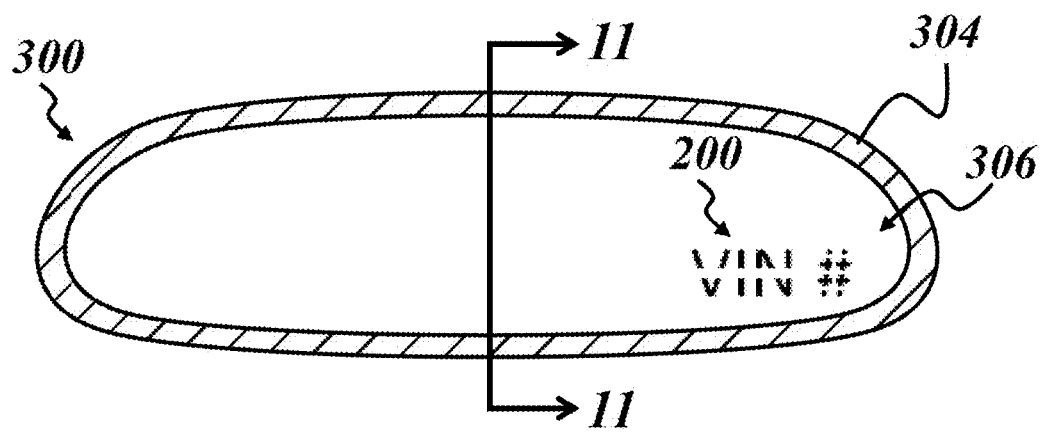
FIG. 9 is a front view of a second electrochromic device in a first state, according to an exemplary embodiment.
Figure 10:
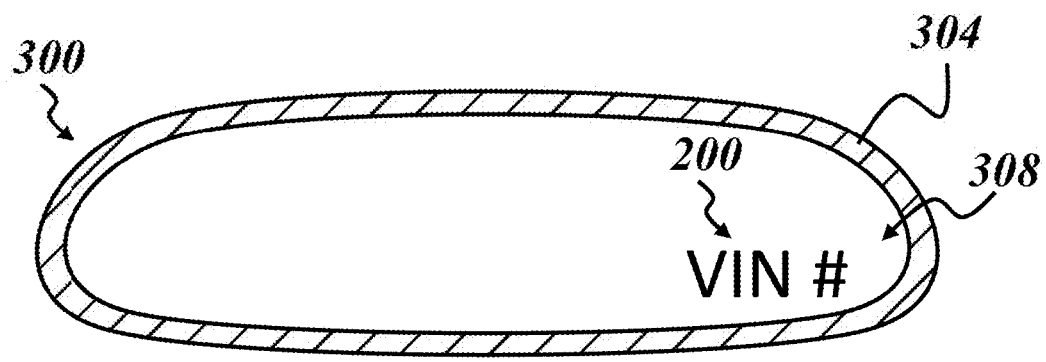
FIG. 10 is a front view of the second electrochromic device of FIG. 9 in a second state, according to an exemplary embodiment.

As shown in FIGS. 6, 8, 9, and 11, the electrochromic device 300 is configured in a first state (e.g., a transparent state, a clear state, a non-tinted state, a non-darkened state, etc.), shown as transparent state 306, such that the indicia 200 thereof is at least partially invisible (e.g., sufficiently invisible, not visible, faint, see through, not noticeable, etc.). As shown in FIGS. 7 and 10, the electrochromic device 300 is configured in a second state (e.g., a tinted state, a darkened state, a dimmed state, etc.), shown as darkened state 308, such that the indicia 200 thereof is visible (e.g., sufficiently visible, distinct, noticeable, etc.). According to an exemplary embodiment, the electrochromic medium 334 disposed within the chamber 332, the transparent conductive layer 316 of the first substrate 310, and (i) the transparent conductive layer 326 or (ii) the reflective conductive layer 328 of the second substrate 320 facilitate selectively displaying the indicia 200. By way of example, a user of the electrochromic device 300 may selectively activate the darkened state 308 of the electrochromic device 300 such that the electrochromic device 300 transitions from the transparent state 306 to the darkened state 308 (e.g., by pressing a dimming button, a tinting button, etc. associated with the electrochromic device 300). The indicia 200 of the window electrochromic device 302 and the mirror electrochromic device 304 created via the first laser ablation process and the second laser ablation process may thereby be invisible while the electrochromic medium 334 is in the transparent state 306 and visible while the electrochromic medium 334 is in the darkened state 308.

Experimental Results

Various experiments were conducted to modify different sample substrates (e.g., substrates such as the workpiece 10, the first substrate 310, the second substrate 320, etc.) using a laser ablation process with varying laser ablation settings and/or parameters. The experiments, as described in more detail herein, demonstrate that various properties of a conductive layer (e.g., the conductive layer 40, the transparent conductive layer 316, the transparent conductive layer 326, the reflective conductive layer 328, etc.) may be altered using a laser ablation method that includes the first laser ablation process and the second laser ablation process described above. More specifically, the thickness, the color, the resistance, and/or still other properties of the conductive layer may be selectively modified using such a laser ablation method.

As shown in Tables 1-4 below, various samples of a substrate were subjected to the above-described laser ablation method. Specifically, various test substrates were subjected to the first laser ablation process and the second laser ablation process, while various control substrates were subjected to only the first laser ablation process. Further, the number of passes made during the second laser ablation process was selectively varied.

Figure 12:
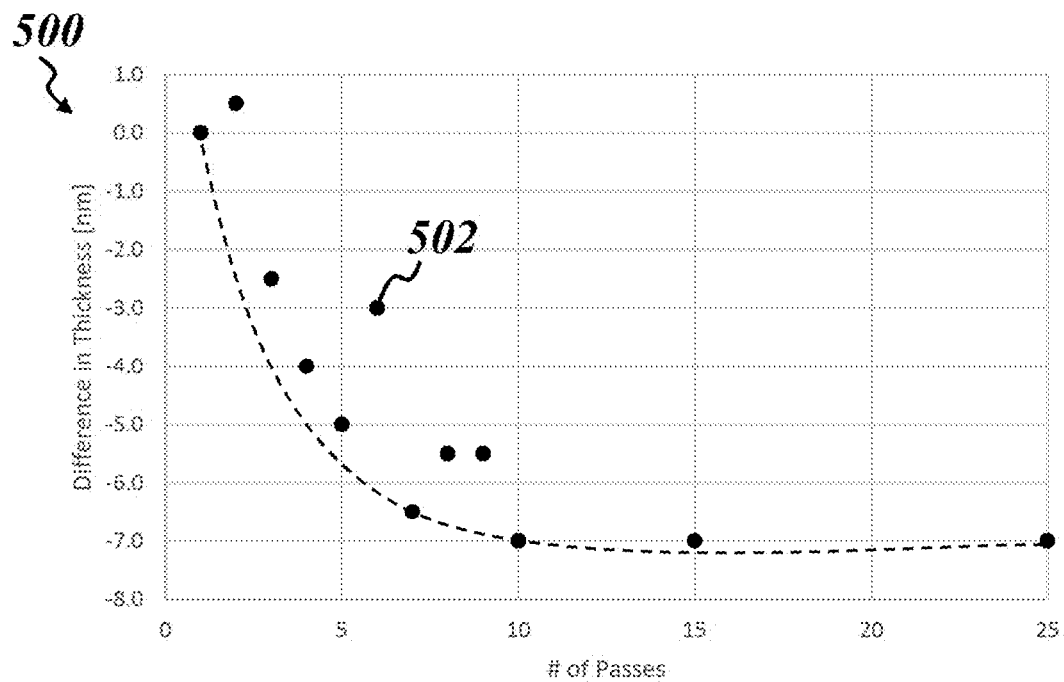
FIG. 12 is a graph depicting thickness data regarding a difference in a thickness of a conductive layer of test substrates relative to control substrates, according to an exemplary embodiment.

Referring to FIG. 12, a graph 500 including differential thickness data points 502 as a function of a number of laser ablation passes is shown according to an example embodiment. The differential thickness data points 502 correspond with the difference in thickness data in Table 1 and depict the difference between associated control substrate thickness data and test substrate thickness data. The control substrate thickness data indicates the thickness of the conductive layer on the control substrates (in nanometers) after undergoing the first laser ablation process (e.g., to remove a coating layer, etc.). The test substrate thickness data indicates the thickness of the conductive layer on the test substrates (in nanometers) after undergoing the first and second laser ablation processes (e.g., to remove a coating layer and then to modify the conductive layer, etc.). As shown in Table 1 and FIG. 12, the thickness of the conductive layer decreases as a respective substrate is exposed to additional laser passes. For example, the thickness of the conductive layer on the test substrate relative to the control substrate was identical after a single laser pass (e.g., the first laser ablation process, etc.), while the thickness of the conductive layer on the test substrates reduced upon subjecting the conductive layer to additional laser passes (e.g., the second laser ablation process, etc.). Specially, as shown in Table 1 and FIG. 12, each subsequent laser pass reduces the thickness of the conductive layer of the test substrates according to a non-linear trend (e.g., similar to a function of $f(x)=1/x$) relative to the conductive layer of the control substrates from having the same thickness after a single pass to seven nanometers less after ten or more laser pulses. In some embodiments, the thickness of the conductive layer is reduced according to another type of trend (e.g., based on the selected parameters of the laser ablation process, etc.). In some embodiments, the thickness of the conductive layer of the test substrates is reduced more than seven nanometers during the second laser ablation process (e.g., ten, fifteen, twenty, etc. nanometers, etc.).

TABLE 1

| | | Thickness Data | | |
|---|---|---|---|---|
| Sample | # of Passes | Average Test Thickness | Average Control Thickness | Difference in Thickness |
| 1 | 1 | 120.0 | 120.0 | 0.0 |
| 2 | 2 | 115.5 | 115.0 | 0.5 |
| 3 | 3 | 115.0 | 117.5 | -2.5 |
| 4 | 4 | 114.5 | 118.5 | -4.0 |
| 5 | 5 | 115.0 | 120.0 | -5.0 |
| 6 | 6 | 114.5 | 117.5 | -3.0 |
| 7 | 7 | 110.0 | 116.5 | -6.5 |

TABLE 1-continued

Thickness Data

| Sample | # of Passes | Average Test Thickness | Average Control Thickness | Difference in Thickness |
|---|---|---|---|---|
| 8 | 8 | 113.5 | 119.0 | −5.5 |
| 9 | 9 | 114.5 | 120.0 | −5.5 |
| 10 | 10 | 111.5 | 118.5 | −7.0 |
| 11 | 15 | 112.5 | 119.5 | −7.0 |
| 12 | 25 | 112.5 | 119.5 | −7.0 |
| 13 | 15 | 112.5 | 117.5 | −5.0 |

Figure 13:
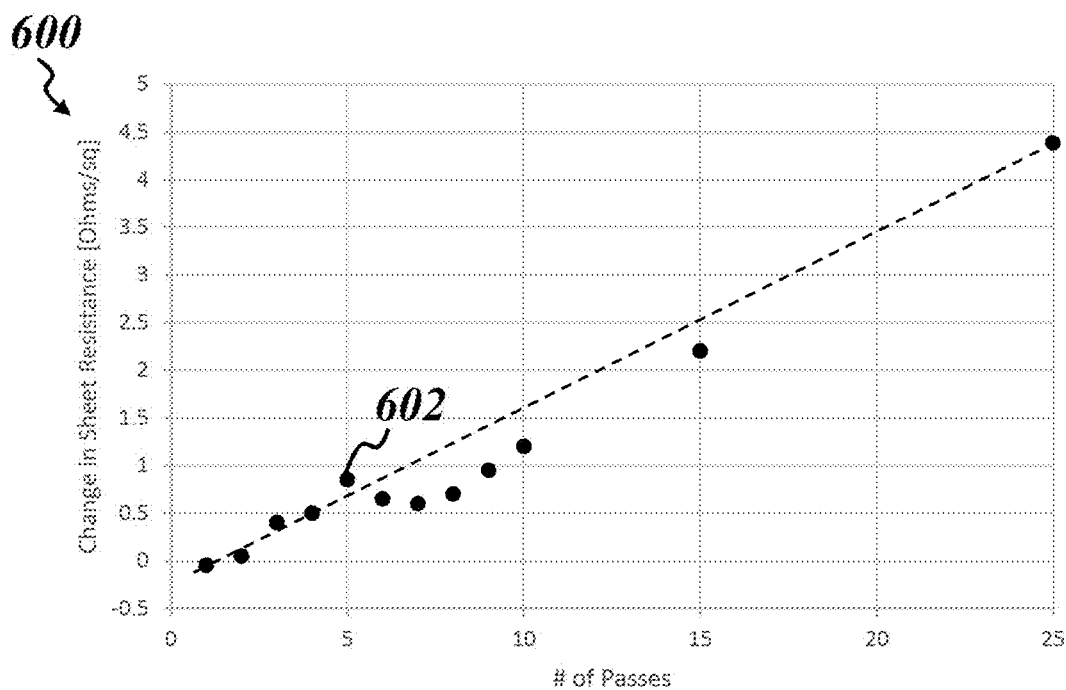
FIG. 13 is a graph depicting resistance data regarding a difference in a resistance of a conductive layer of test substrates relative to control substrates, according to an exemplary embodiment.

Referring to FIG. 13, a graph 600 including resistance data points 602 as a function of a number of laser ablation passes is shown according to an example embodiment. The resistance data points 602 correspond with the difference in resistance data in Table 2 and depict the change in resistance of the conductive layer on the test substrates (in ohms/square) after undergoing the first laser ablation process and the second laser ablation process relative to the resistance of the conductive layer on the control substrates after undergoing only the first laser ablation process. As shown in Table 1 and FIG. 13, the resistance of the conductive layer increases upon each subsequent laser pass according to a substantially linear trend (e.g., similar to a function of $f(x)=mx$, etc.). In some embodiments, the resistance of the conductive layer increases according to another type of trend (e.g., a non-linear trend, based on the selected parameters of the laser ablation process, etc.).

TABLE 2

Resistance Data

| Sample | # of Passes | Test | Control | Difference in Sheet Resistance |
|---|---|---|---|---|
| 1 | 1 | 14.4 | 14.5 | 0.0 |
| 2 | 2 | 14.5 | 14.4 | 0.0 |
| 3 | 3 | 15.3 | 14.9 | 0.4 |
| 4 | 4 | 15.1 | 14.6 | 0.5 |
| 5 | 5 | 15.5 | 14.6 | 0.9 |
| 6 | 6 | 15.5 | 14.9 | 0.7 |
| 7 | 7 | 15.1 | 14.5 | 0.6 |
| 8 | 8 | 15.1 | 14.4 | 0.7 |
| 9 | 9 | 15.1 | 14.1 | 1.0 |
| 10 | 10 | 15.1 | 13.9 | 1.2 |
| 11 | 15 | 16.4 | 14.2 | 2.2 |
| 12 | 25 | 18.3 | 14.0 | 4.4 |
| 13 | 15 | 15.5 | 13.9 | 1.7 |

Figure 14:
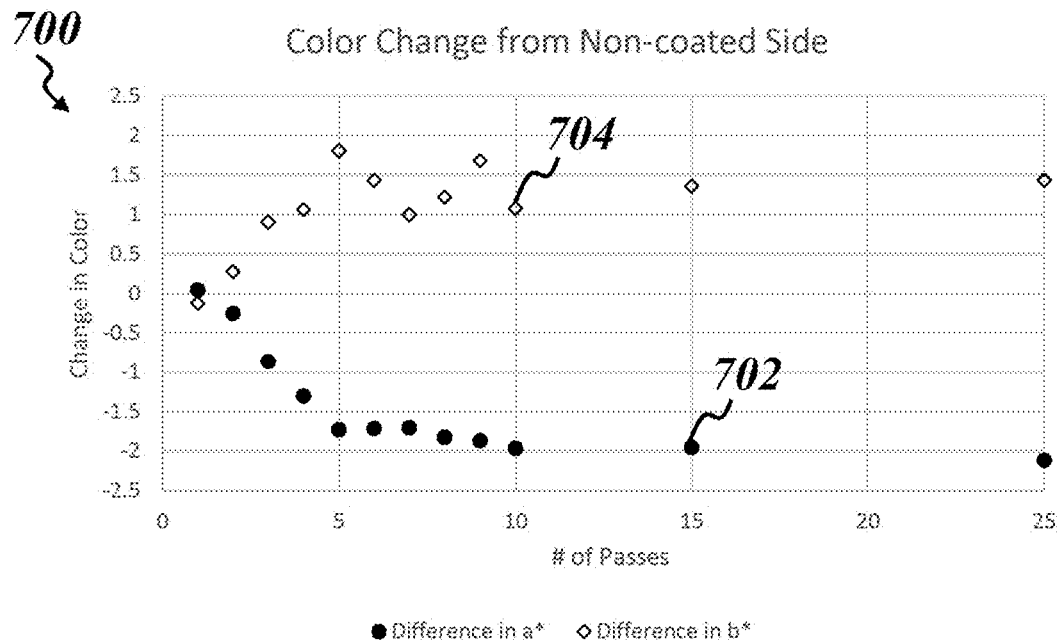
FIGS. 14-16 are various graphs depicting color data regarding a change in color of a conductive layer of test substrates relative to control substrates, according to an exemplary embodiment.
Figure 15:

Referring now to FIG. 14, a graph 700 includes a* data points 702 and b* data points 704 as a function of a number of laser ablation passes. The a* data points 702 and b* data points 704 correspond with the data in Table 3 and depict the change in color in a* space and b* space as seen and measured from a non-coated surface (e.g., the first side 18, the exterior surface 312, the exterior surface 324, etc.) of the test substrates after undergoing the first and second laser ablation processes relative to as seen and measured from the non-coated surface of the control substrates after undergoing only the first laser ablation process. Referring now to FIG. 15, a graph 800 includes a* data points 802 and b* data points 804 as a function as a number of laser ablation passes. The a* data points 802 and b* data points 804 correspond with the data in Table 4 and depict the change in color in a* space and b* space as seen and measured from a coated surface (e.g., the second side 16, the interior surface 314, the interior surface 322, etc.) of the test substrates after undergoing the first and second laser ablation processes relative to as seen and measured from the coated surface of the control substrates after undergoing only the first laser ablation process.

TABLE 3

Non-Coated Surface Data

| Sample | # of Passes | Average Test a* | Average Control a* | Difference in a* | Average Test b* | Average Control b* | Difference in b* | Average Test L* | Average Control L* | Difference in L* | Delta E* |
|---|---|---|---|---|---|---|---|---|---|---|---|
| 1 | 1 | 4.184 | 4.142 | 0.042 | 7.170 | 7.296 | −0.126 | 38.722 | 38.726 | −0.005 | 0.133 |
| 2 | 2 | 1.920 | 2.172 | −0.253 | 10.400 | 10.125 | 0.275 | 40.043 | 39.813 | 0.230 | 0.438 |
| 3 | 3 | 2.324 | 3.192 | −0.869 | 10.077 | 9.175 | 0.902 | 40.481 | 39.735 | 0.746 | 1.458 |
| 4 | 4 | 1.801 | 3.107 | −1.306 | 10.091 | 9.033 | 1.058 | 40.104 | 38.937 | 1.167 | 2.046 |
| 5 | 5 | 2.426 | 4.160 | −1.734 | 9.636 | 7.832 | 1.805 | 40.301 | 38.863 | 1.438 | 2.886 |
| 6 | 6 | 1.952 | 3.666 | −1.715 | 10.025 | 8.597 | 1.428 | 40.853 | 39.444 | 1.409 | 2.639 |
| 7 | 7 | 1.034 | 2.744 | −1.710 | 10.498 | 9.504 | 0.995 | 40.998 | 39.538 | 1.461 | 2.459 |
| 8 | 8 | 1.318 | 3.143 | −1.825 | 9.770 | 8.550 | 1.220 | 40.530 | 39.076 | 1.454 | 2.633 |
| 9 | 9 | 2.097 | 3.968 | −1.871 | 9.087 | 7.411 | 1.676 | 40.249 | 39.004 | 1.245 | 2.804 |
| 10 | 10 | 1.061 | 3.031 | −1.970 | 9.925 | 8.851 | 1.075 | 40.433 | 39.126 | 1.307 | 2.597 |
| 11 | 15 | 1.738 | 3.695 | −1.958 | 9.383 | 8.025 | 1.358 | 39.834 | 39.183 | 0.651 | 2.469 |
| 12 | 25 | 1.957 | 4.076 | −2.119 | 8.855 | 7.426 | 1.429 | 39.003 | 38.725 | 0.278 | 2.570 |
| 13 | 15 | 1.283 | 3.109 | −1.826 | 9.871 | 8.649 | 1.222 | 40.063 | 38.789 | 1.275 | 2.540 |

TABLE 4

Coated Surface Data

| Sample | # of Passes | Average Test a* | Average Control a* | Difference in a* | Average Test b* | Average Control b* | Difference in b* | Average Test L* | Average Control L* | Difference in L* | Delta E* |
|---|---|---|---|---|---|---|---|---|---|---|---|
| 1 | 1 | 4.239 | 4.226 | 0.013 | 6.281 | 6.329 | −0.048 | 39.897 | 39.913 | −0.016 | 0.052 |
| 2 | 2 | 1.863 | 2.184 | −0.321 | 9.482 | 9.036 | 0.447 | 41.334 | 41.100 | 0.234 | 0.597 |

TABLE 4-continued

Coated Surface Data

| Sample | # of Passes | Average Test a* | Average Control a* | Difference in a* | Average Test b* | Average Control b* | Difference in b* | Average Test L* | Average Control L* | Difference in L* | Delta E* |
|---|---|---|---|---|---|---|---|---|---|---|---|
| 3 | 3 | 2.334 | 3.193 | −0.859 | 9.577 | 8.283 | 1.294 | 41.481 | 40.985 | 0.496 | 1.630 |
| 4 | 4 | 1.818 | 3.085 | −1.268 | 9.486 | 7.832 | 1.654 | 41.154 | 40.388 | 0.766 | 2.220 |
| 5 | 5 | 2.558 | 4.215 | −1.657 | 9.295 | 6.884 | 2.411 | 41.124 | 40.180 | 0.944 | 3.074 |
| 6 | 6 | 2.018 | 3.750 | −1.732 | 9.978 | 7.846 | 2.132 | 41.558 | 40.565 | 0.993 | 2.921 |
| 7 | 7 | 1.121 | 2.789 | −1.668 | 10.492 | 8.877 | 1.615 | 41.750 | 40.663 | 1.087 | 2.563 |
| 8 | 8 | 1.396 | 3.179 | −1.783 | 9.854 | 7.830 | 2.024 | 41.210 | 40.207 | 1.003 | 2.877 |
| 9 | 9 | 2.156 | 4.067 | −1.911 | 9.229 | 6.602 | 2.627 | 40.830 | 40.060 | 0.769 | 3.338 |
| 10 | 10 | 1.103 | 3.032 | −1.929 | 10.118 | 7.997 | 2.122 | 41.150 | 40.351 | 0.799 | 2.976 |
| 11 | 15 | 1.947 | 3.753 | −1.806 | 9.705 | 7.124 | 2.581 | 40.206 | 40.305 | −0.099 | 3.152 |
| 12 | 25 | 2.155 | 4.097 | −1.943 | 9.070 | 6.355 | 2.715 | 39.369 | 40.000 | −0.631 | 3.397 |
| 13 | 15 | 1.405 | 3.082 | −1.677 | 9.847 | 7.406 | 2.441 | 40.599 | 40.279 | 0.320 | 2.978 |

According to an exemplary embodiment, color can be mapped onto a three-dimensional integer space referred to as lab color space. Lab color space in defined by a* space, b* space, and L* space. L* space represents lightness, a* space represents red/green opponent colors, and b* space represents yellow/blue opponent colors. For example, a L* value in L* space represents a lightness between the darkest black and the whitest white, a negative a* value represents a green color and a positive a* value represents a red color, and a negative b* value represents a blue color and a positive b* value represents a yellow color. As shown in FIGS. 14 and 15, subjecting the test substrates to additional laser passes causes the color of the coating layer to increase (e.g., become more positive, etc.) in b* space (e.g., more yellow, etc.) and decrease (e.g., become more negative, etc.) in a* space (e.g., more green, etc.).

By measuring the color of the conductive layer in lab space for both the test substrates and the control substrates, the color difference therebetween can be quantified as shown in Equation (1):

$$\Delta E^* = \sqrt{(\Delta a^*)^2 + (\Delta b^*)^2 + (\Delta L^*)^2} \quad (1)$$

where ΔE* is the color difference, Δa* is the difference between the a* value for the test substrate and the control substrate, Δb* is the difference between the b* value for the test substrate and the control substrate, and ΔL* is the difference between the L* value for the test substrate and the control substrate.

Figure 16:
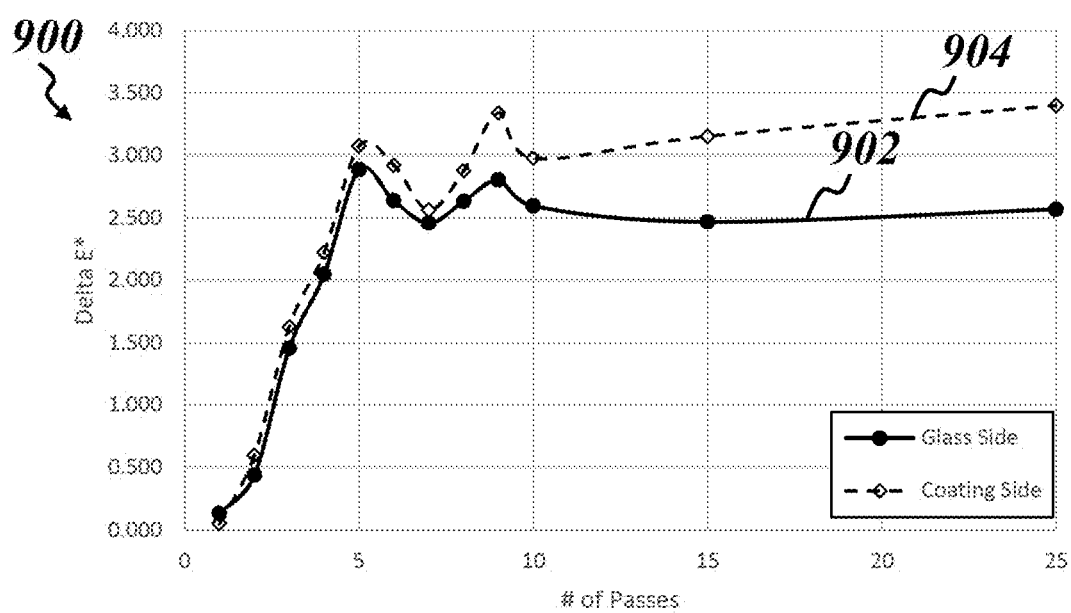

Referring now to FIG. 16, a graph 900 includes a first color change curve or non-coated side color change curve 902 and a second color change curve or coated side color change curve 904. As shown in Tables 3 and 4, and FIG. 16, as the coating layer of the test substrates is subjected to additional laser passes during the second laser ablation process, the greater the color change of the test substrates. Specifically, the color change may range from 0 to 3.5 or higher. As one example, it may be desired to have a faint indicia 200 or a "just-noticeable difference" ("JND") such that the number of laser passes of the second laser ablation process is selected such that the change in color is in the range between 0 and 1.0 (e.g., 0.13, 0.4, 0.6, etc.). As another example, it may be desired to have an indicia 200 that is more distinct and noticeable such that the number of laser passes of the second laser ablation process is selected such that the change in color is greater than 1.0 (e.g., 1.5, 2.3, 2.8, 3.1, 3.3, etc.).

As represented in FIGS. 12, 13, and 16, the thickness, resistance, and/or color of a conductive layer of a substrate may therefore be selectively altered or modified as desired by controlling the number of laser passes (and the laser properties such as speed, spacing, intensity, diameter, etc.) to which the substrate is subjected during the second laser ablation process.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A product comprising:
    a first substrate that is at least partially transparent to visible light, the first substrate including:
        a first surface;
        an opposing second surface; and
        a first electrically conductive layer disposed on the opposing second surface, the first electrically conductive layer having a first ablated area and a second ablated area entirely disposed within and overlapping a portion of the first ablated area, wherein the second ablated area defines a selectively visible indicia.

2. The product of claim 1, wherein the first ablated area is formed by subjecting the first electrically conductive layer to a first laser ablation process, and wherein the second ablated area is formed by subjecting the first electrically conductive layer to the first laser ablation process and a second laser ablation process.

3. The product of claim 1, further comprising a second substrate spaced apart from the first substrate, wherein the second substrate has a third surface and an opposing fourth surface, the third surface including a second electrically conductive layer disposed thereon.

4. The product of claim 3, wherein the second electrically conductive layer is a reflective conductive layer.

5. The product of claim 3, wherein the second electrically conductive layer is a transparent conductive layer.

6. The product of claim 1, wherein the first ablated area of the first electrically conductive layer has a first thickness and the second ablated area of the first electrically conductive layer has a second thickness, wherein the second thickness is less than the first thickness.

7. The product of claim 1, wherein the first ablated area of the first electrically conductive layer has a first resistance and the second ablated area of the first electrically conductive layer has a second resistance, wherein the second resistance is greater than the first resistance.

8. The product of claim 1, wherein the first ablated area of the first electrically conductive layer has a first color and the second ablated area of the first electrically conductive layer has a second color, wherein the second color is different than the first color.

9. An electrochromic device comprising:
a first substrate having a first surface and an opposing second surface, the opposing second surface including a first electrically conductive layer disposed thereon having a first ablated area and a second ablated area entirely disposed within and overlapping a portion of the first ablated area, wherein the first ablated area is formed by subjecting the first electrically conductive layer to a first laser ablation process, and wherein the second ablated area is formed by additionally subjecting the portion of the first ablated area to a second laser ablation process;
a second substrate spaced from the first substrate to define an interior chamber therebetween, the second substrate having a third surface and an opposing fourth surface, the third surface including a second electrically conductive layer disposed thereon; and
an electrochromic medium disposed within the interior chamber between the first electrically conductive layer and the second electrically conductive layer, wherein the second ablated area is at least partially invisible while the electrochromic medium is in a transparent state, and wherein the second ablated area is visible while the electrochromic medium is in a darkened state.

10. The electrochromic device of claim 9, wherein the first electrically conductive layer is a transparent conductive layer.

11. The electrochromic device of claim 9, wherein the second electrically conductive layer is a transparent conductive layer or a reflective conductive layer.

12. The electrochromic device of claim 9, wherein the second ablated area includes a selectively visible indicia.

13. The electrochromic device of claim 9, wherein the first ablated area of the first electrically conductive layer has a first thickness and the second ablated area of the first electrically conductive layer has a second thickness, wherein the second thickness is less than the first thickness.

14. The electrochromic device of claim 9, wherein the first ablated area of the first electrically conductive layer has a first resistance and the second ablated area of the first electrically conductive layer has a second resistance, wherein the second resistance is greater than the first resistance.

15. The electrochromic device of claim 9, wherein the first ablated area of the first electrically conductive layer has a first color and the second ablated area of the first electrically conductive layer has a second color, wherein the second color is different than the first color.

16. A method comprising:
providing a substrate having a first side and an opposing second side, the opposing second side including a conductive layer and a coating layer disposed thereon;
subjecting the substrate to a first laser ablation pass such that the coating layer is removed from at least a portion of the conductive layer; and
subjecting the portion of the conductive layer to one or more additional laser ablation passes to modify a property of at least a sub-portion of the portion of the conductive layer, wherein the sub-portion of the conductive layer is not removed entirely from the substrate, and wherein the sub-portion is completely contained within an area of the portion of the conductive layer subjected to the first laser ablation pass such that the one or more additional laser ablation passes do not remove any of the coating layer from the conductive layer.

17. The method of claim 16, wherein modifying the property of the sub-portion of the conductive layer induces an optical characteristic change to the conductive layer that creates a selectively visible indicia within the substrate.

18. The method of claim 16, wherein the property of the conductive layer includes a thickness, wherein the thickness of the sub-portion of the conductive layer is less than the remaining portion of the conductive layer.

19. The method of claim 16, wherein the property of the conductive layer includes a resistance, wherein the resistance of the sub-portion of the conductive layer is greater than the remaining portion of the conductive layer.

20. The method of claim 16, wherein the property of the conductive layer includes a color, wherein the color of the sub-portion of the conductive layer is different than the remaining portion of the conductive layer.

* * * * *